United States Patent [19]
Moriya et al.

[11] Patent Number: 5,610,879
[45] Date of Patent: Mar. 11, 1997

[54] OPTICAL REPRODUCING DEVICE, OPTICAL REPRODUCING METHOD USING THE SAME, AND OPTICAL RECORD MEDIUM USED IN THE SAME

[75] Inventors: Mitsurou Moriya, Ikoma; Hiromichi Ishibashi, Ibaraki; Takeo Ohta, Nara; Yasuhiro Sugihara, Katano, all of Japan

[73] Assignee: Matsushita Electric Industrial Co. Ltd., Osaka, Japan

[21] Appl. No.: 206,752

[22] Filed: Mar. 7, 1994

[30] Foreign Application Priority Data

Mar. 5, 1993 [JP] Japan ................... 5-044730

[51] Int. Cl.⁶ ................................................ G11B 7/09
[52] U.S. Cl. ................................ 369/13; 369/275.2
[58] Field of Search .................. 369/275.1, 275.2, 369/275.3, 275.4, 110, 109, 44.37, 13, 116, 100

[56] References Cited

U.S. PATENT DOCUMENTS

| 4,332,022 | 5/1982 | Ceshkovsky et al. | 369/116 |
|---|---|---|---|
| 5,024,927 | 6/1991 | Yamada et al. | 369/100 |
| 5,194,363 | 3/1993 | Yoshioka et al. | 369/275.2 |
| 5,230,973 | 7/1993 | Yoshioka et al. | 369/116 |
| 5,249,175 | 9/1993 | Akahira et al. | 369/275.4 |
| 5,291,470 | 3/1994 | Yamaguchi et al. | 369/116 |
| 5,305,297 | 4/1994 | Nishiuchi et al. | 369/116 |
| 5,305,303 | 4/1994 | Akahira et al. | 369/275.4 |
| 5,341,349 | 8/1994 | Kajami et al. | 369/275.2 |
| 5,341,358 | 8/1994 | Kobayashi et al. | 369/275.2 |
| 5,346,740 | 9/1994 | Ohno et al. | 369/275.2 |
| 5,390,162 | 2/1995 | Fukumoto et al. | 369/116 |
| 5,432,774 | 7/1995 | Fukumoto et al. | 369/275.4 |
| 5,450,387 | 9/1995 | Ono et al. | 369/44.37 |

FOREIGN PATENT DOCUMENTS 3-292632  12/1991  Japan.

Primary Examiner—Nabil Hindi
Attorney, Agent, or Firm—Ratner & Prestia

[57] ABSTRACT

A record medium according to the present invention includes a substrate having concave or convex information pits and a thermosensitive material film formed on the substrate. The thermosensitive material film is changed from a high reflectance state to a low reflectance state when its temperature becomes a high level and returns to the high reflectance state when its temperature decreases to a low level. In the case where information is reproduced, when a light beam having a predetermined power is irradiated to the record medium, heat generated by the light beam is confined in the pits and the temperature in the pits increases; the thermosensitive material on the pits becomes the low reflectance state. The flat portions between the pits has high heat radiation and thus, the temperature in the flat portions does not increase so much; therefore, the state of the thermosensitive material film on the flat portions is not changed. Thus, an optical power of reflected light from the pits to which a light beam is irradiated is decreased, so that an amplitude of a reproduced signal is increased.

11 Claims, 9 Drawing Sheets

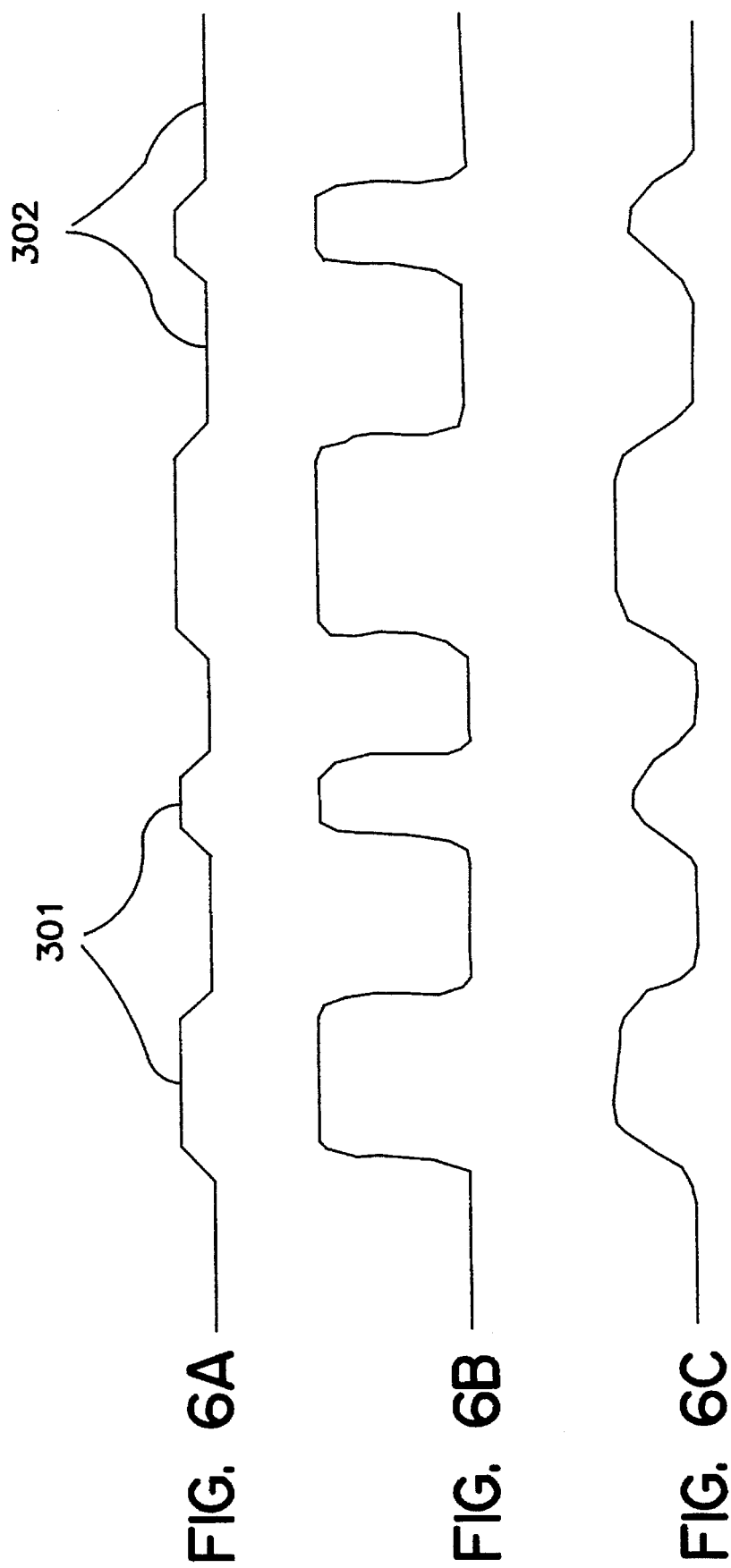

OPTICAL REPRODUCING DEVICE, OPTICAL REPRODUCING METHOD USING THE SAME, AND OPTICAL RECORD MEDIUM USED IN THE SAME

BACKGROUND OF THE INVENTION

1. Field of the Invention

The present invention relates to an optical reproducing device for reproducing information by irradiating a converged light beam to a record medium and detecting light reflected from the record medium or light transmitted therethrough. The present invention also relates to an optical reproducing method using the device and an optical record medium used in the device.

2. Description of the Related Art

In recent years, optical record media dedicated for reproducing information have played an important role for storing voice information data, video information data, and various other information data, because of their large capacity. Under this circumstance, an optical record medium having a larger capacity end a smaller-sized optical reproducing device have been demanded. In order to satisfy these demands, the recording density of a record medium should be increased.

A conventional optical reproducing-only device is described, lot example, in U.S. Pat. No. 4,332,022. An optical record medium used in this device includes a resin substrate in a disk shape and a reflective film made of aluminum or the like. The resin substrate has information tracks on its surface (an information carrier), consisting of concave or convex pits formed in a spiral shape or a concentric shape, and the reflective film is formed over the information carrier on the substrate by sputtering and the like. The recording density of this type of record medium is determined by the pitch of the information tracks and recording density in each track direction, i.e., linear density of information. Thus, in order to increase the recording density of the record medium, it is required that the track pitch is made smaller and/or the linear density is increased.

However, in the conventional record medium, when the track pitch is decreased, crosstalk from adjacent tracks is increased; when the linear density is increased, the interference among pits is increased. In order to overcome these problems, the spot size of a light beam irradiated to the record medium needs to be regulated. On the other hand, the track pitch and linear density are determined by the spot size. Thus, the regulation of a recording density is restricted by the spot size of a light beam which is suitable for preventing the crosstalk from adjacent tracks and the interference among pits.

SUMMARY OF THE INVENTION

In the optical reproducing method using a record medium of this invention comprising a substrate having concave or convex information pits and a thermosensitive material film, formed on the substrate, which is changed from a high reflectance state to a low reflectance state when a temperature thereof exceeds a predetermined temperature T and returns to the high reflectance state when the temperature thereof decreases to the temperature T or less, a light beam having a predetermined power is irradiated to the record medium so that a temperature of the thermosensitive material film on the pits exceeds the temperature T and a temperature of the thermosensitive material film on flat portions between the pits becomes the temperature T or less, thereby reading information recorded in the record medium.

In one embodiment of the present invention, the thermosensitive material film is a phase-change type recording material which melts to attain the low reflectance state when the temperature thereof exceeds the temperature T and which solidifies to attain the high reflectance state when the temperature thereof decreases the temperature T or less.

In another embodiment of the present invention, the thermosensitive material film is a phase-change type recording material which melts to attain the low reflectance state when the temperature thereof exceeds the temperature T and which crystallizes to attain the high reflectance state when the temperature thereof decreases to the temperature T or less.

According to another aspect of the present invention, in an optical reproducing method using a record medium comprising a substrate having concave or convex information pits, a thermosensitive material film, formed on the substrate, which is changed from a high reflectance state to a low reflectance state when a temperature thereof exceeds a predetermined temperature T and returns to the high reflectance state when the temperature thereof decreases to the temperature T or less, and a reflective layer formed on the thermosensitive material film, a phase difference between a light reflected from the thermosensitive material film on flat portions between the pits and a light transmitted through the thermosensitive material film on the pits and reflected from the reflective layer being larger than a phase difference between a light reflected from the thermosensitive material film on the flat portions and a light reflected from the thermosensitive material film on the pits, a light beam having a predetermined power is irradiated to the record medium so that a temperature of the thermosensitive material film on the pits exceeds the temperature T and a temperature of the thermosensitive material film on the flat portions decreases to the temperature T or less, thereby reading information recorded in the record medium.

According to still another aspect of the present invention, an optical record medium comprises: a substrate having concave or convex information pits; a thermosensitive material film, formed on the substrate, which is changed from a high reflectance state to a low reflectance state when a temperature thereof exceeds a predetermined temperature T and returns to the high reflectance state when the temperature thereof decreases to the temperature T or less; and a reflective layer formed on the thermosensitive material film, wherein a phase difference between a light reflected from the thermosensitive material film on flat portions between the pits and a light transmitted through the thermosensitive material film on the pits and reflected from the reflective layer is larger than a phase difference between a light reflected from the thermosensitive material film on the flat portions and a light reflected from the thermosensitive material film on the pits.

In one embodiment of the present invention, the thermosensitive material film is a phase-change type recording material which melts to attain the low reflectance state when the temperature thereof exceeds the temperature T and which solidifies to attain the high reflectance state when the temperature thereof decreases to the temperature T or less.

In another embodiment of the present invention, the thermosensitive material film is a phase-change type recording material which melts to attain the low reflectance state when the temperature thereof exceeds the temperature T and which crystallizes to attain the high reflectance state when the temperature thereof decreases to the temperature T or less.

In another embodiment of the present invention, the phase difference between the light reflected from the thermosensitive material film on the flat portions and the light transmitted through the thermosensitive material film on the pits and reflected from the reflective layer is ½ of a wavelength of a light beam for reading information.

In another embodiment of the present invention, assuming that a refractive index of the substrate is n, a wavelength of a light beam for reading information is $\lambda$, and a depth of the pits is d, the depth d satisfies the relation nd $\leq \lambda/8$.

In another embodiment of the present invention, assuming that a thickness of the thermosensitive material film is $W_1$ and a depth of the pits is d, the depth d satisfies the relation $W_1 \leq d$.

According to still another aspect of the present invention, an optical reproducing device for reading information from a record medium comprising a substrate having concave or convex information pits and a thermosensitive material film, formed on the substrate, which is changed from a high reflectance state to a low reflectance state when a temperature thereof exceeds a predetermined temperature T and returns to the high reflectance state when the temperature thereof decreases to the temperature T or less, comprises: a light source for emitting a light beam for reading information; converging means for converging the light beam emitting from the light source on the record medium; photodetecting means for detecting light reflected from or transmitted through the record medium; reading means for reading information recorded on the record medium on the basis of an output signal from the photodetecting means; command signal generating means for generating a command signal starting reading of the information; and power control means for setting power of the light beam irradiated to the record medium in response to the command signal from the common signal generating means so that a temperature on the thermosensitive material film on the pits exceeds the temperature T and a temperature of the thermosensitive material film on flat portions between the pits decreases to the temperature T or less.

According to the above-mentioned method or record medium, only the thermosensitive material film on the pits to which a light beam having a predetermined power is irradiated becomes a low reflectance state. Therefore, the optical power of reflected light from the pits is decreased to obtain a reproduced signal with a good quality. In addition, the effects of adjacent pits is reduced, so that the intersymbol interference or crosstalk is decreased, whereby information can be reproduced with high density.

Moreover, according to the present invention, only the thermosensitive material film on the pits to which a light beam having a predetermined power is irradiated becomes a low reflectance state. Therefore, the light beam irradiated to the pits is transmitted through the thermosensitive material film and reflected from the reflective layer to obtain a reflected light; a phase difference larger than that corresponding to the depth of the pits can be obtained. Thus, a reproduced signal with good quality can be obtained. Furthermore, the effects of adjacent pits is reduced, so that the intersymbol interference or crosstalk is reduced, whereby information can be reproduced with high density.

Thus, the invention described herein makes possible the advantages of (1) providing an optical reproducing device capable of increasing a recording density of an optical reproducing-only record medium, (2) providing a method using the optical reproducing device, and (3) providing an optical record medium used in the optical reproducing device.

These and other advantages of the present invention will become apparent to those skilled in the art upon reading and understanding the following detailed description with reference to the accompanying figures.

BRIEF DESCRIPTION OF THE DRAWINGS

FIG. 6A is a cross-sectional configuration of concave pits on the record medium, and FIGS. 6B and 6C show waveforms of reproduced signals, for illustrating the reproducing principle according to the present invention.

DESCRIPTION OF THE PREFERRED EMBODIMENTS

The present invention will be described by way of illustrative examples with reference to the drawings.

EXAMPLE 1

Figure 1:
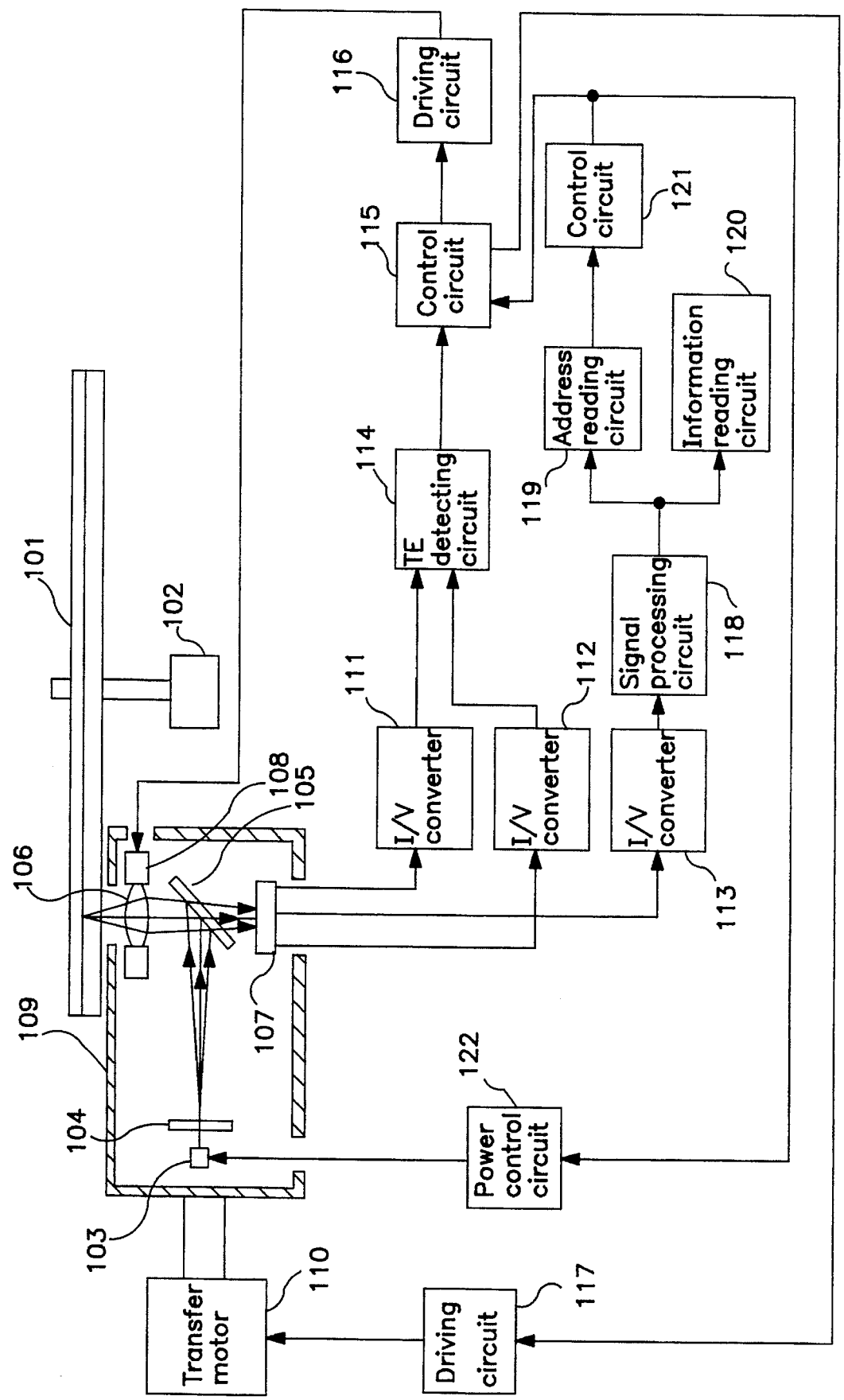
FIG. 1 is a block diagram of an optical reproducing device of Example 1 according to the present invention.

FIG. 1 is a block diagram of an optical reproducing device of Example 1 according to the present invention. The optical reproducing device of FIG. 1 is used for reproducing information in a reproducing-only optical record medium 101 (hereinafter, referred to as a record medium) in a disk shape. The record medium 101 has tracks provided as concave or convex pits in a spiral shape or in a concentric shape, and information is recorded in these tracks.

Hereinafter, the structure of the optical reproducing device will be described.

The optical reproducing device includes a motor 102 for rotating the record medium 101, an optical system, an actuator 108 for moving the optical system, a transfer plate 109, and a transfer motor 110. The optical system irradiates a light beam for reproducing information to the record medium 101 and detects light reflected therefrom. The record medium 101 is provided on a rotation axis so as to be rotated for a predetermined velocity.

The optical system includes a light source 103 such as a semiconductor laser, a phase grating 104, a beam splitter 105, an objective lens 106, and a photodetector 107. A light beam emitted from the light source 103 is incident upon the phase grating 104 and divided into three light beams, i.e., zeroth-order light, ± first-order lights. Although the light beam emitted from the light source 103 has a predetermined spread, only a central ray is shown in FIG. 1. The three light beams obtained by the phase grating 104 are reflected from the beam splitter 105 and are converged by the objective lens 106 to be irradiated to the record medium 101. The zeroth-order light (hereinafter, referred to as a primary light beam) is for reading information recorded in the record medium 101, and two sub-light beams (i.e., ±first-order lights) are for detecting a positional shift between the primary light beam and the track on the record medium. Three light beams reflected from the record medium 101 are transmitted through the objective lens 106 and through the beam splitter 105 to be irradiated to the photodetector 107.

The actuator 108 for moving the objective lens 106 is composed of a movable part and a stationary part. The objective lens 106 is attached to the movable part of the actuator 108. The actuator 108 includes a coil for tracking provided on the movable part and a permanent magnet provided on the stationary part. When an electric current flows through the coil for tracking, the coil is moved by an electromagnetic force in a radial direction of the record medium 101, i.e., in a direction traversing the tracks on the record medium 101. The movable part of the actuator 108 also has a coil for focusing. When an electric current flows through the coil for focusing, the objective lens 106 can be moved by an electromagnetic force in a direction orthogonal to the surface of the record medium 101. In this optical reproducing device, the objective lens 106 is controlled by a known focus control system (not shown) so that a light beam irradiated to the record medium 101 is always in a predetermined converged state. The transfer plate 109 is provided with the light source 103, the phase grating 104, the beam splitter 105, the photodetector 107, and the stationary part of the actuator 108. The transfer plate 109 is moved by the transfer motor 110 in a radial direction of the record medium 101.

Figure 2:
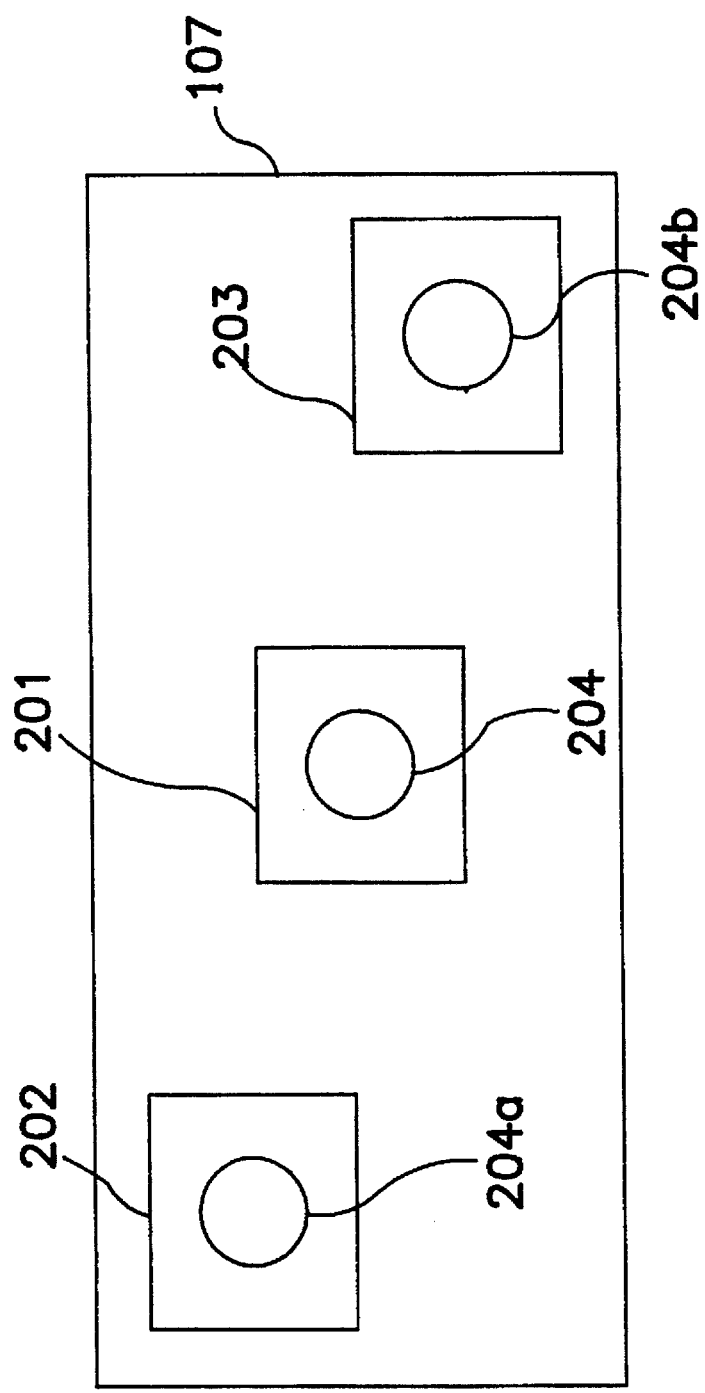
FIG. 2 is a plan view of a photodetector.

The photodetector 107 includes three photodetecting regions 201, 202, and 203, as shown in FIG. 2. These photodetecting regions 201, 202, and 203 are provided on the photodetector 107 so that the primary light beam and the sub-light beams reflected from the record medium 101 (respectively, represented by the reference numerals 204, 204a, and 204b) are irradiated to the photodetector 107 as shown in FIG. 2. That is, reflected light 204 is obtained from the primary light beam and reflected lights 204a and 204b are obtained from the sub-light beams.

The optical reproducing device further includes I/V converters 111, 112, and 113 for converting a current into a voltage, a TE detecting circuit 114 for detecting a tracking error signal, a control circuit 115, a driving circuit 116 for driving the actuator 108, and a driving circuit 117 for driving the transfer motor 110.

A photocurrent in the photodetecting region 202 of the photodetector 107, that in the photodetecting region 203 of the photodetector 107, that in the photodetector region 201 of the photodetector 107 are input to the I/V converters 111, 112, and 113, respectively. Output signals from the I/V converters 111 and 112 are respectively input to the TE detecting circuit 114, and the TE detecting circuit 114 outputs a signal in accordance with the difference between the output signals from the I/V converters 111 and 112. The output signal from the TE detecting circuit 114 represents a positional deviation between the primary light beam converged on the record medium 101 and the track, i.e., becomes a tracking error signal (also referred to as a tracking error signal). The tracking error signal is detected by a known three-beam method the description of which will be omitted herein. The tracking error signal of the TE detecting circuit 114 is supplied to a tracking coil of the actuator 108 through the control circuit 115 and the driving circuit 116. The control circuit 115 includes a phase compensation circuit for compensating the phase of a tracking control system, and the driving circuit 116 works for amplifying an electric power. In this way, the objective lens 106 is subjected to tracking control so that the primary light beam is always positioned on the track of the record medium 101. The tracking error signal of the TE detecting circuit is also supplied to the transfer motor 110 through the control circuit 115 and the driving circuit 117, and the transfer plate 109 is transfer-controlled so that the objective lens 106 moves with respect to its state applied with no driving force.

Figure 3:
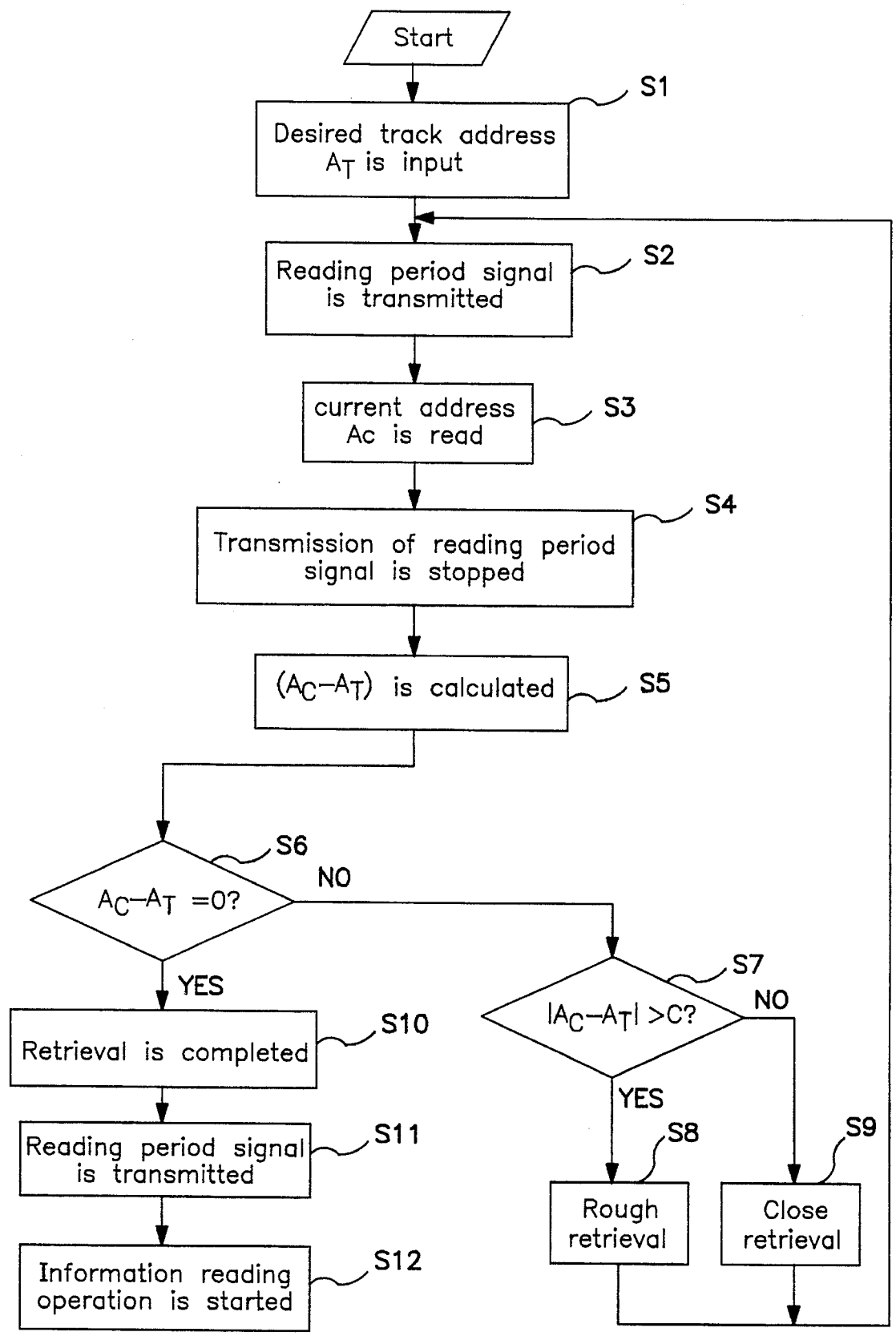
FIG. 3 is a flow chart for illustrating the process of reading information by retrieving a desired track.

The optical reproducing device further includes a signal processing circuit 118 to which the output signal from the I/V converter 113 is input, an address reading circuit 119, an information reading circuit 120, a control circuit 121, and a power control circuit 122. These components will be described below with reference to a flow chart of FIG. 3 together with the reproducing operation of information recorded in the record medium 101 as concave or convex pits.

The power control circuit 122 controls the light power of a light beam emitting from the light source 103. In an idling state, the light power of the primary light beam emitting from the light source 103 is set to be a predetermined low value, such as about 1 mW. In this state, tracking control and transfer control are performed to drive the actuator 108 and the transfer motor 110 so that the primary light beam is positioned on the track of the record medium 101.

In Step 81, a desired track address $A_T$ for reading information is input to the control circuit 121. In Step S2, the control circuit 121 transmits a reading period signal, e.g., a high-level signal to the power control circuit 122 and the control circuit 115. In Step 83, an address $A_c$ of a track of the record medium 101, on which the primary light beam is currently present, is read. The operation of reading the address $A_c$ is performed as follows:

First, the power control circuit 122 sets the light power of the primary light beam at a predetermined high value such as 15 mW, in response to the reading period signal from the control circuit 121. The control circuit 115 decreases the circuit gain to ⅕, for example, so that the loop gain of the tracking control system is not changed. The signal processing circuit 118 processes (e.g., equalizes) and pulses an output signal from the I/V converter 113, and transmits the pulsed signal to the address reading circuit 119 and the information reading circuit 120. Herein, the I/V converter 113 outputs a signal corresponding to the primary light beam reflected from the record medium 101. The control circuit 121 recognizes the address $A_c$ of the track of the record medium 101 on which the primary light beam is positioned, on the basis of an address transmitted from the address reading circuit 119. Thereafter, the control circuit 121 stops transmitting the reading period signal and sets the light power of the primary light beam at a predetermined low value, thereby rendering the circuit gain of the control circuit 115 that of the original one.

In Step S5, the address $A_c$ thus read and the address $A_T$ of the desired track are compared to calculate the distance therebetween (i.e., $A_c-A_T$). In Step S6, the control circuit 121 judges whether the distance ($A_c-A_T$) is 0 or not, thereby recognizing the matching of the addresses $A_c$ and $A_T$. More specifically, in the case where the distance ($A_c-A_T$) is not 0, that is, the address $A_c$ is not matched with the address AT, the process proceeds to Step S7.

In Step S7, the control circuit 121 judges whether the calculated distance $(A_c-A_T)$ exceeds a predetermined range C or not. In the case where the distance $(A_c-A_T)$ exceeds the range C, in Step S8, a rough retrieval operation is performed. More specifically, in Step S8, the transfer motor 110 is driven under the condition that the tracking control is not performed, thus moving the transfer plate 109 in a radial direction of the record medium 101, and when the transfer plate 109 reaches the vicinity of the desired track, the tracking control operation is started again. Thereafter, the process returns to Step 82. In Step S2, the reading period signal is again transmitted to the power control circuit 122 and the control circuit 115. In Step S3, the address $A_c$ of the track of the record medium 101 on which the primary light beam is currently positioned is read based on the address transmitted from the address reading circuit 119. In Step 84, the transmission of the reading period signal is stopped. In Step S5, the distance $(A_c-A_T)$ is calculated. In the case where it is judged in Step S6 that the address $A_c$ is not matched with the address $A_T$, the process proceeds to Step S7. Herein, in the case where the calculated distance $(A_c-A_T)$ exceeds the predetermined range C, the above-mentioned rough retrieval is performed again.

On the other hand, in the case where the calculated distance $(A_c-A_T)$ does not exceed the predetermined range C in Step S7, the actuator 108 is driven to perform a close retrieval by scanning tracks (i.e., jumping tracks one by one). Thereafter, Steps S2 to 84 are repeated again. That is, the control circuit 121 transmits the reading period signal to the power control circuit 122 and the control circuit 115, and upon reading the address $A_c$, stops transmitting the reading period signal and sets the light power of the primary light beam at a predetermined low value.

In the case where the address $A_c$ thus read is matched with the address $A_T$ of the desired track in Step 86, the retrieval is completed in Step S10. In the case where the address $A_c$ thus read is not matched with the address $A_T$ of the desired track in Step 86, the above-mentioned retrieval operation is repeated to retrieve the desired track. When the desired track is retrieved, the control circuit 121 transmits the reading period signal to the power control circuit 122 and the control circuit 115 in Step S11. Thereafter, the process proceeds to Step 812, and an information reading operation is started. More specifically, the following operation is performed.

The power control circuit 122 sets the light power of the primary light beam at a predetermined high value, in response to the reading period signal from the control circuit 121, and the control circuit 115 decreases the circuit gain so that the loop gain of the tracking control is not changed. The output signal from the I/V converter 113 is processed by the signal processing circuit 118 and transmitted to the information reading circuit 120, where information is read. Herein, the I/V converter 113 outputs a signal corresponding to the primary light beam reflected from the record medium 101.

The structure of the record medium 101 will be described with reference to FIGS. 4A and 4B.

Figure 4A:
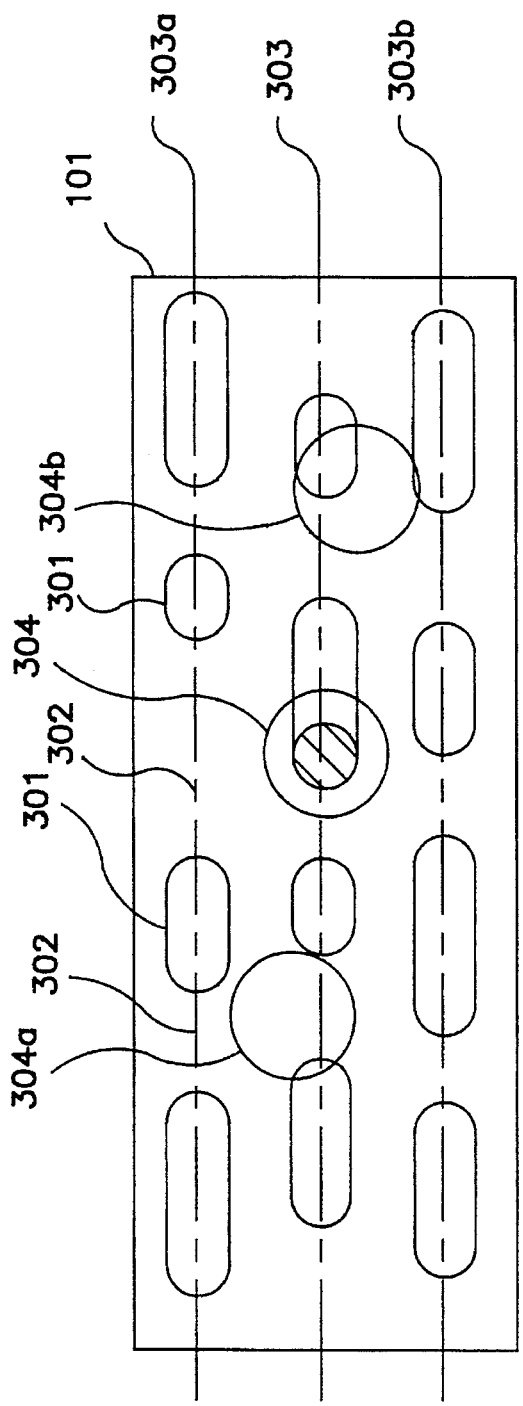
FIGS. 4A and 4B are a plan view and a cross-sectional view of an enlarged record medium, for illustrating the reproducing principle according to the present invention.

FIG. 4A is a diagram showing a partially enlarged surface of the record medium 101. The record medium 101 includes concave or convex pits 301 recorded in a spiral shape or in a concentric shape. Each track is composed of the pits 301 and flat portions 302 between the respective pits 301. Dash-dot lines 303, 303a, and 303b represent center lines of the respective tracks. Three light beam spots 304, 304a, and 304b are irradiated to the center track of the record medium 101 in FIG. 4a. The light beam spot 304 corresponds to the primary light beam spot, and the light beam spots 304a and 304b correspond to sub-light beam spots for detecting the tracking error signal.

Figure 4B:
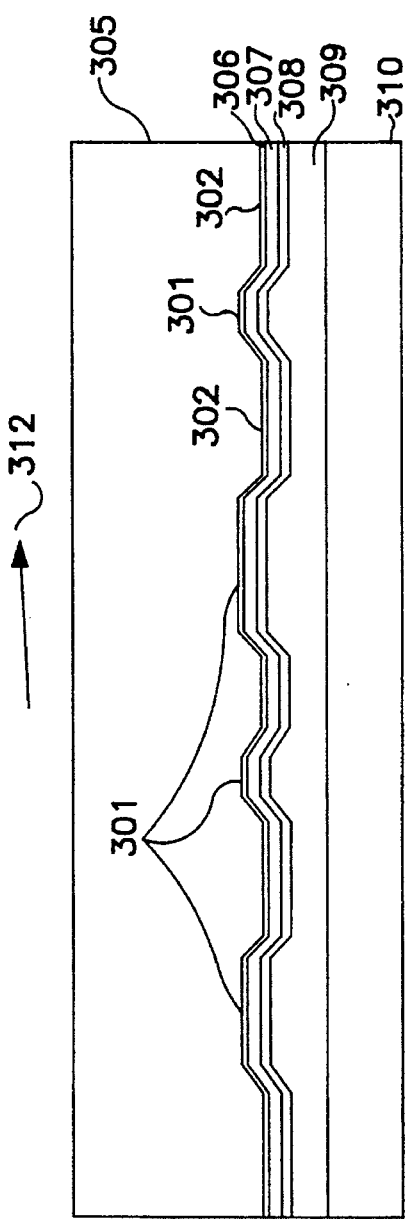

FIG. 4B is a cross-sectional view of the record medium taken along the dash-dot line 303. A substrate 305 made of polycarbonate resin or the like has concave or convex pits 301. On the substrate 305, a dielectric film 306 made of $SiO_2$ or the like, a thermosensitive material film 307, and a dielectric film 308 are formed in this order. Furthermore, the record medium 101 includes a protecting layer 310 adhered to the dielectric film 308 through an adhesive layer 309 made of an adhesive.

The thermosensitive material film 307 is sensitive to heat. The reflectance of the thermosensitive material film 307 is changed when its temperature exceeds a predetermined temperature due to the heat of the primary light beam irradiated to the record medium 101 and the reflectance returns to the original one when its temperature decreases. In addition, the thermosensitive material film 307 has a characteristic that its heat conductivity is larger than that of the substrate 305. As a material having such a characteristic, phase-change type recording material containing Te, Sb, and Ge as its main components is known. The phase-change type recording material is reversibly changed between a crystalline crate and an amorphous state depending upon the conditions of heat applied to the material. For example, when the temperature of the material is high, the material melts to decrease its reflectance; on the other hand, when the temperature of the material is low, the material attains a crystalline state with high reflectance. Other phase-change recording materials are known, such as a material containing Sb and Se as its main components, a material containing Te, Ge, and Sn as its main components, a material containing In and Se as its main components, and a material containing In and Sb as its main components.

Hereinafter, the principle for reproducing information recorded as concave or convex pits in the record medium 101 will be described.

The thermosensitive material film 307 is formed by sputtering, vapor deposition, or the like, and the thickness of the thermosensitive material film 307 on the flat portions 302 and the pits 301 are almost the same. However, since each boundary region between the flat portions 302 and the pits 301 has a slope, the thickness of the thermosensitive material film 307 on the region is smaller than that on the flat portion 302 and the pit 301. As the slope of the boundary region is steeper, the thickness of the thermosensitive material film 307 on the slope is smaller. For example, when the slope is 90 degrees, the thickness of the thermosensitive material film 307 thereon becomes almost zero. Thus, when the primary light beam is irradiated to the thermosensitive material film 307, heat generated by the primary light beam dissipates in all directions through the thermosensitive material film 307 on the flat portions 302; however, on the pits 301, heat hardly dissipates because of small thickness of the thermosensitive material film 307 on the boundary regions. As a result, the temperature of the thermosensitive material film 307 on the pits 301 becomes higher than that on the flat portions 302. For example, it is assumed that the thermosensitive material film 307 is made of a phase-change recording material in a crystalline state, and the power of the primary light beam on the recording medium 101 is set at a predetermined power during reproducing information. In this case, the temperature of the thermosensitive material film 307 on the flat portions 302 does not reach a melting point;

however, the thermosensitive material film 307 on the pits, to which the primary light beam is irradiated, has its temperature increased to a melting point or more and melts. In FIG. 4A, assuming that the primary light beam 304 moves in the direction indicated by an arrow 312. Part of the thermosensitive material film 307 (indicated by a hatched portion) on the pit 301, the temperature of which reaches a predetermined temperature or more, melts.

Figure 5A:
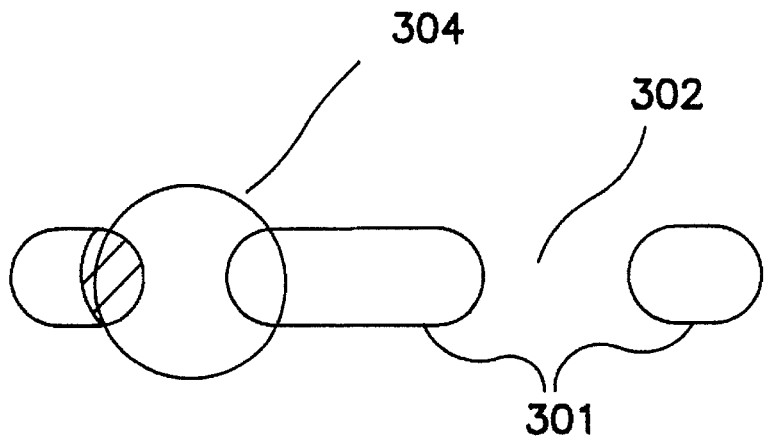
FIGS. 5A to 5F show the melt state of a thermosensitive material film, in the case where a primary light beam moves along a track on a record medium.
Figure 5B:
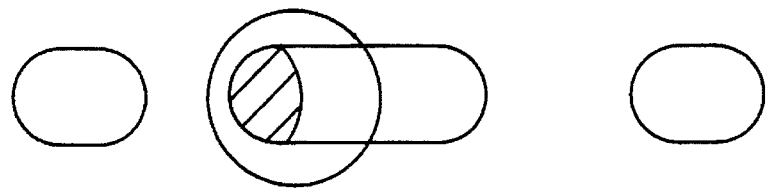

FIGS. 5A to 5F show the melt state of the thermosensitive material film 307 using hatched portions, in the case where the primary light beam 304 moves along the track on the record medium 101. FIGS. 5A to 5F show the state in which the primary light beam 304 gradually moves with time. As is understood from these figures, only the thermosensitive material film 307 on the pits 301 melts, and the thermosensitive material film 307 on the flat portions 302 does not melt. In the melted portion of the thermosensitive material film 307, the reflectance decreases; as a result, the light power of the primary light beam 304 reflected therefrom decreases. Thus, large pit information can be obtained. As shown in FIG. 5A, a tip end portion of one pit 301 irradiated with the primary light beam 304 does not melt, while a hatched portion of another pit 301 irradiated with the primary light beam 304 melts. The reason for this is that the melt portion of the pit 301 is irradiated with the primary light beam 304 for a longer period of time, compared with the tip end portion of the pit 301; thus, the temperature of the tip end portion does not sufficiently increase because of the short period of time of irradiation, while the temperature of the hatched portion increases. After a predetermined period of time since the primary light beam 304 passes through the thermosensitive material film 307, the portion of the thermosensitive material film 307 through which the primary light beam 304 passes is crystallized. Thus, the portion recovers its original high reflectance.

The relation between the primary light beam 304 and the melt state of the thermosensitive material film 307 is varied depending upon the characteristic of a thermosensitive material, the thickness of the thermosensitive material film 307 or the dielectric films 306 and 308, and irradiation conditions of the primary light beam. For example, a portion of the pit 301 irradiated with a trailing end of the primary light beam is made crystallized.

As described above, only the thermosensitive material film 307 on the pits 304 whose temperature is increased with the movement of the primary light beam 304, so that the effect of adjacent pits 301 in a track direction, that is, intersymbol interference is decreased, resulting in the improvement of the frequency characteristics.

FIG. 6A shows a cross-sectional configuration of concave or convex pits on the record medium 101, and FIGS. 6B and 6C show waveforms of reproduced signals of information recorded in the record medium 101. The waveform of reproduced signal in FIG. 6B is obtained when the primary light beam 304 having a predetermined power sufficient for melting the thermosensitive material film 307 is irradiated thereto. The waveform of reproduced signal in FIG. 6C is obtained when the primary light beam 304 having such a low power that the thermosensitive material film 307 does not melt is irradiated thereto. In FIGS. 6B and 6C, an upward direction of the drawing surface represents that the power of reflected light is smaller. A waveform of a reproduced amplitude is standardized. More specifically, assuming that the power of the primary light beam 304 for obtaining the reproduced signal represented by the waveform of FIG. 6C is 1 mW and the power of the primary light beam 304 for obtaining the reproduced signal represented by the waveform of FIG. 6B is 15 mW, the amplitude of the reproduced signal of FIG. 6B is represented by $1/15$.

Figure 5C:
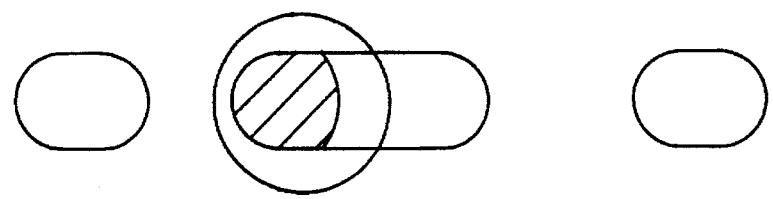
Figure 5D:
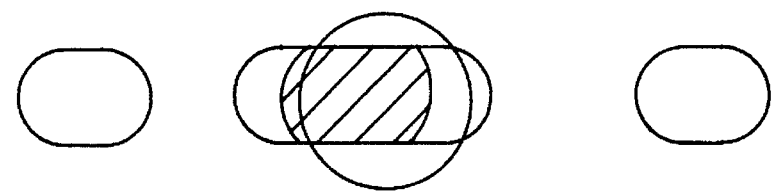
Figure 5E:
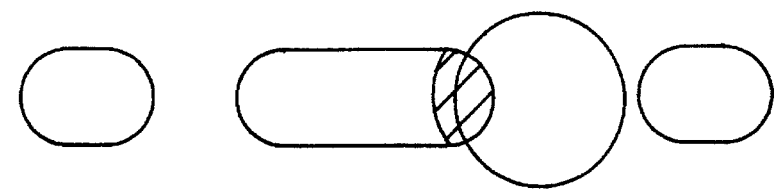
Figure 5F:
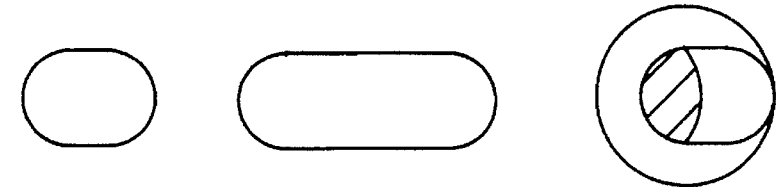

As shown in FIG. 5C, even in the case where the thermosensitive material film 307 does not melt, the power of reflected light becomes small when the primary light beam 304 is irradiated to the pits 301. However, as shown in FIG. 6B, when the primary light beam 304 having a power enough to melt the thermosensitive material film 307 is irradiated thereto, the reflectance of the melt portion of the thermosensitive material film 307 is decreased, resulting in the decrease in the light power of reflected primary light beam 304. Thus, in this case, a large reproduced signal can be obtained. Since such a large reproduced signal can be obtained, the effect of adjacent pits is relatively reduced, and spatial resolution is improved. Consequently, a reproduced signal with a satisfactory carrier-to-noise (signal-to-noise) ratio (C/N ratio) is obtained and spatial resolution is improved, leading to the increase in linear density of information.

As described above, only the thermosensitive material film 307 of the pits 304 melts and a pit amplitude obtained from the melt portion is increased; therefore, the effect of adjacent pits in the track direction, i.e., intersymbol interference is reduced and frequency characteristics can be improved. It is also understood that crosstalk from adjacent tracks is relatively reduced. According to the present invention, the track pitch is decreased and high linear density is realized.

Figure 7A:
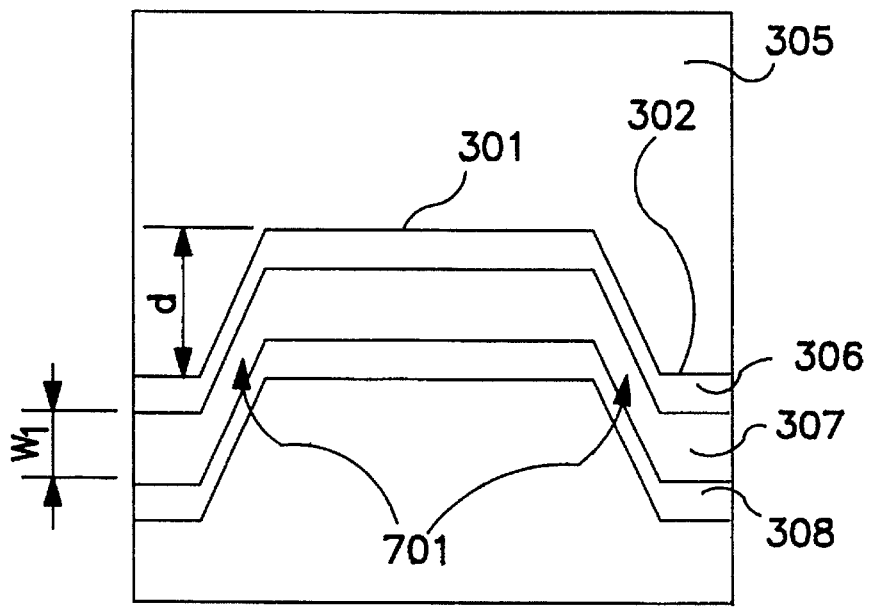
FIGS. 7A and 7B are cross-sectional views of an enlarged record medium, for illustrating the radiation of heat of a light beam irradiated to a pit.
Figure 7B:
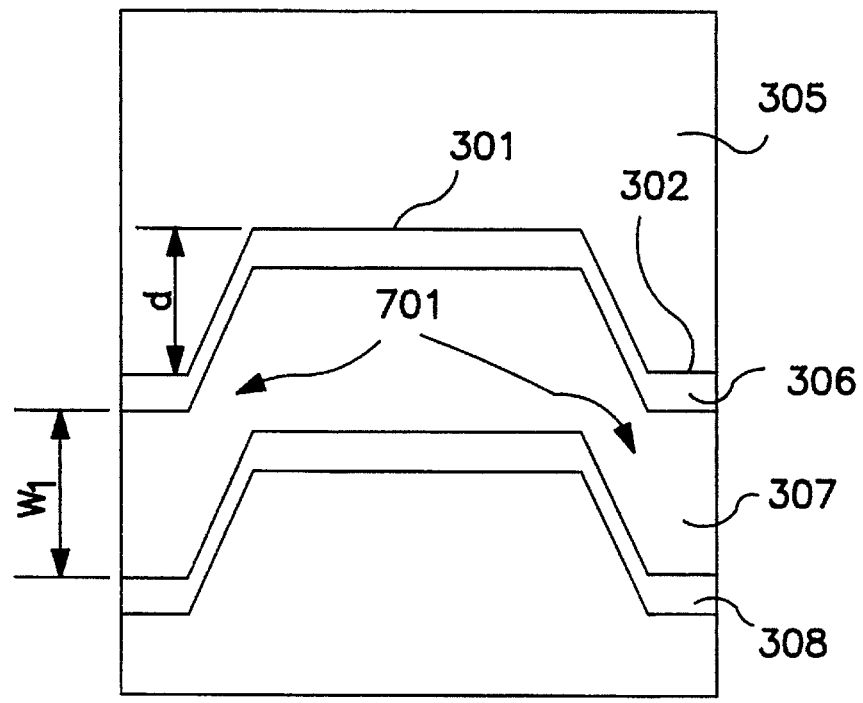

The depth of concave or convex pits on the record medium 101 will be described with reference to FIGS. 7A and 7B. FIGS. 7A and 7B respectively show one enlarged pit 301 of FIG. 4B. In FIG. 7A, a depth d of the pit 301 is set to be larger than a thickness $W_1$ of the thermosensitive material film 307, and in FIG. 7B, the depth d of the pit 301 is set to be smaller than the thickness $W_1$ of the thermosensitive material film 307. An arrow 701 indicates the radiation direction of heat generated by the primary light beam 304 irradiated to the pit 301 in the thermosensitive material film 307.

As is understood from FIGS. 7A and 7B, a heat shielding effect at the boundary region between the pit 301 and the flat portion 302 is larger in the case of $d>W_1$ than in the case of $d<W_1$. Thus, because of the heat confined in the pit 301, the temperature of the pit 301 increases more in the case of $d>W_1$ than in the case of $d<W_1$. Assuming that the minimum power of the primary light beam 304 for melting the thermosensitive material film 307 on the flat portion 302 is $P_1$ and the minimum power of the primary light beam 304 which does not melt the thermosensitive material film 307 on the pit 301 is $P_2$, the difference between $P_1$ and $P_2$ is increased in the case of $d>W_1$, resulting in the increase in margin of the power fluctuation of the primary light beam 304. As described above, the depth d is preferably set so as to satisfy the relation $d>W_1$.

Moreover, the depth d of the concave or convex pits is set to be about $\lambda/(8n)$ or less: more specifically, the depth d is set so as to have an optical path length nd of $\lambda/8$. Herein, $\lambda$ is a wavelength of the primary light beam 304 and n is a refractive index of the substrate 305. In general, a conventional reproducing-only record medium has a pit depth of about $\lambda/(4n)$. This is because, in a range of $\lambda/(4n)$ or less, the power modulation of the primary light beam 304 reflected from the record medium caused by the pit 301 becomes larger as the depth of the pit 301 is made larger and becomes maximum at the depth of $\lambda/(4n)$. When the pit depth is set to be $\lambda/(4n)$, while the primary light beam 304 is irradiated to the pit 301, the light power of reflected primary light beam 304 becomes extremely small. However, when the pit depth is set to be λ/(4n), the effect of adjacent pits 301, i.e., intersymbol interference or crosstalk is increased. According to the present invention, it is required that a large reproduced signal is obtained when a strong light beam is irradiated to the thermosensitive material film 307 on the pit 301 and the effect of adjacent pits is decreased. For this purpose, the depth d of pit is preferably set to be d≦λ/(8n).

It is not intended that the present invention be limited to the above-mentioned record medium. For example, for the purpose of improving sensitivity, a reflective film made of aluminum or the like may be further provided on the dielectric film 308. In addition, according to the present invention, the pits 301 are provided on the substrate so as to have a concave shape; however, the pits 301 may be provided so as to have a convex shape. Since the dielectric films 306 and 308 are provided for protecting the thermosensitive material film 307 from humidity and heat shock, they can be omitted.

EXAMPLE 2

Another example of a record medium 101a according to the present invention will be described with reference to FIG. 8A. The identical components with those in FIGS. 4a and 4B bear the identical numerals. The record medium of the present example includes a reflective film 313 made of aluminum or the like between the dielectric film 308 and the adhesive layer 309.

Figure 8A:
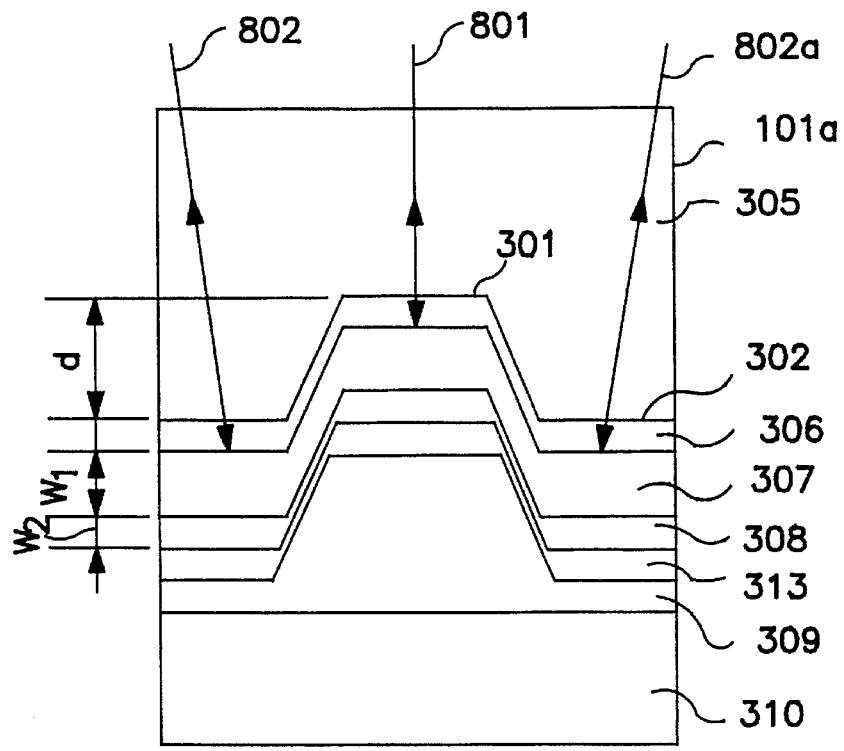
FIGS. 8A and 8B are cross-sectional views of an enlarged record medium of Example 2 suitable for a reproducing method according to the present invention.

FIG. 8A shows a state in which the thermosensitive material film 307 on the pit 301 does not melt. In this state, the difference in round trip optical path length between a reflected light 801 from the thermosensitive material film 307 on the pit 301 and reflected lights 802, 802a from the thermosensitive material film 307 on the flat portion 302, that is, phase difference $\Delta\theta_1$ is represented by the following equation 1, since the depth d of the pit 301 is set to be d≦λ/(8n):

$$\theta_1 = 2nd \leq \lambda/4 \qquad (1)$$

Figure 8B:
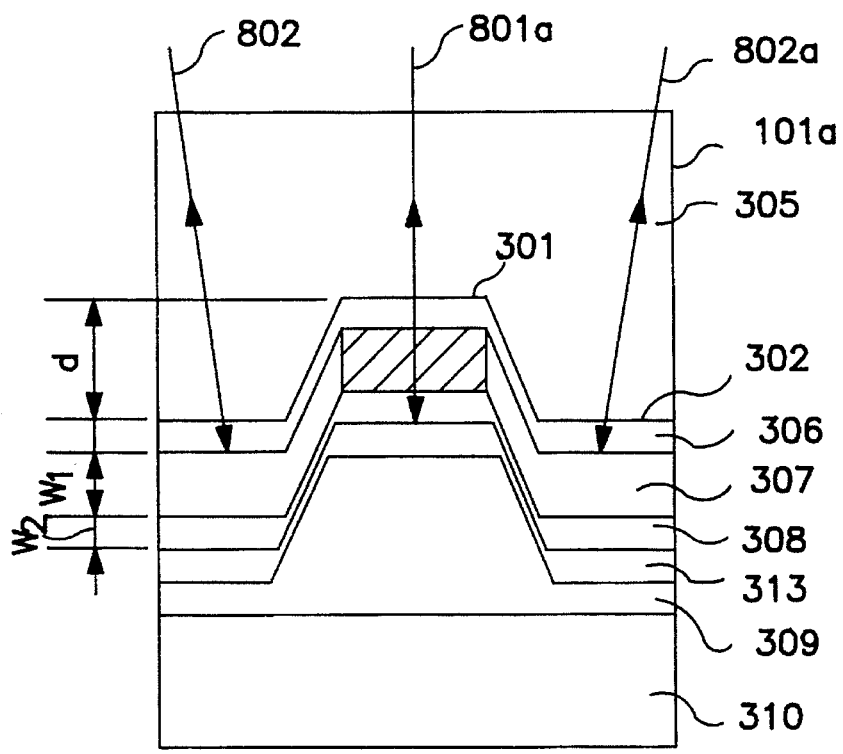

FIG. 8B shows a state in which the thermosensitive material film 307 on the pit 301 melts upon being irradiated with a strong light beam for reproducing information. In this state, a phase difference $\Delta\theta_2$ of a light beam 801a transmitted through the melt portion of the thermosensitive material film 307 and reflected from the reflective film 313 and reflected lights 802, 802a reflected from the thermosensitive material film 307 is represented by the following equation 2:

$$\theta_2 = 2\{nd - (n_1 W_1 + n_2 W_2)\} \qquad (2)$$

where $n_1$ is the refractive index of the thermosensitive material film 307, $W_1$ is the film thickness of the thermosensitive material film 307, $n_2$ is the refractive index of the dielectric film 308, and $W_2$ is the film thickness of the dielectric film 308.

As described above, in the case where the phase difference is equal to or less than λ/2 (one way optical path length: λ/4), the power modulation of the reflected light is larger, as the phase difference is larger; thus, a reproduced signal with good quality can be obtained. Accordingly, when the thickness of the thermosensitive material film 307 and the dielectric film 308 is set so as to satisfy $\Delta\theta_1 \leq \Delta\theta_2$, better reproduced signal can be obtained under the condition that the thermosensitive material film 307 is melted. In particular, when the thickness of the thermosensitive material film 307 and the dielectric film 308 is set so as to satisfy $\Delta\theta_2 = \lambda/2$, the best reproduced signal can be obtained.

In the record medium 101a shown in FIGS. 8A and 8B, since only the thermosensitive material film 307 on the pit 301 melts to increase the pit amplitude, the intersymbol interference is decreased and the frequency characteristic is improved, and crosstalk from adjacent tracks can be reduced in the same way as in the record medium 101 shown in FIGS. 4A and 4B. Thus, in this example, the linear density is also increased and the track pitch can be made smaller, realizing high density recording.

EXAMPLE 3

Figure 9:
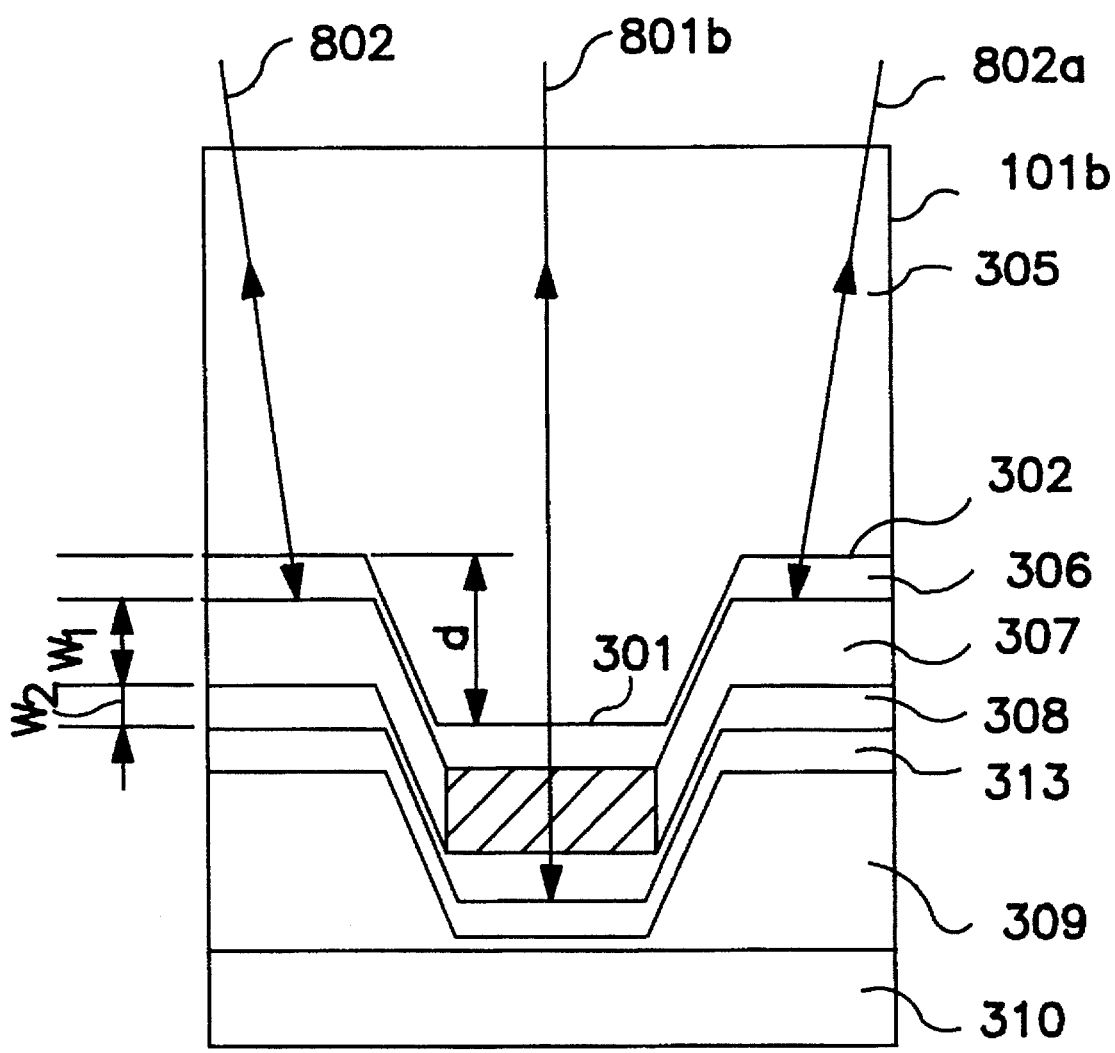
FIG. 9 is a cross-sectional view of a record medium of Example 3 suitable for the reproducing method according to the present invention.

FIG. 9 shows another example of a record medium. In a record medium 101b shown in this figure, a signal is detected by a phase difference in the same way as in the record medium shown in FIG. 8. In this example, the pits 301 are provided in a convex shape.

In the record medium 101b of FIG. 9, under the condition that the thermosensitive material film 307 on the pit 301 is not melted, a phase difference $\Delta\theta_1$ between the reflected light 801 from the thermosensitive material film 307 on the pit 301 and the reflected lights 802, 802a from the thermosensitive material film 307 on the flat portion 302 is represented by the following equation 3:

$$\theta_1 = 2nd \leq \lambda/4 \qquad (3)$$

Under the condition that the thermosensitive material film 307 on the pit 301 is melted upon being irradiated with a strong light beam, a phase difference $\Delta\theta_2'$ between the light beam 801b transmitted through the melt portion of the thermosensitive material film 307 represented by a hatched portion and reflected from the reflective film 313 and the reflected lights 802, 802a reflected from the thermosensitive material film 307 on the flat portion 302 is represented by the following equation 4:

$$\Delta\theta_2' = 2\{nd + (n_1 w_1 + n_2 w_2)\} \qquad (4)$$

When the thickness of the thermosensitive material film 307 and the dielectric film 308 is set so as to satisfy $\Delta\theta_1 \leq \Delta\theta_2'$, better reproduced signal can be obtained under the condition that the thermosensitive material film 30 is melted. When the thickness of the thermosensitive material film 307 and the dielectric film 308 is set so as to satisfy $\Delta\theta_2' = \lambda/2$, the best reproduced signal can be obtained.

It is noted that the present invention is not limited to the above-mentioned examples.

For example, when a phase-change type recording material is used for the thermosensitive material film, the thermosensitive material film has higher reflectance in a crystalline state than in an amorphous state, and a reproduced signal with a more satisfactory quality can be obtained. According to the present invention, a phase-change type recording material, which melts at a high temperature to decrease its reflectance and assumes an amorphous state with high reflectance at a low temperature, may be used. Various phase-change recording materials are known; among them, phase-change recording materials which have decreased reflectance in a molten state and have high reflectance at a lower temperature can be applied to the present invention. In addition, the material for the thermosensitive material film is not limited to a phase-change type recording material; any thermosensitive material which has decreased reflectance at a higher temperature and has increased reflectance at a lower temperature can be used.

In the example shown in FIG. 1, a strong light beam is irradiated to the record medium only during the information reading period; a strong light beam can be irradiated to the record medium at all times. However, when the strong light beam is irradiated to the record medium at all times, it is likely that the substrate or dielectric film deforms, the thermosensitive material film deteriorates, and the like. Therefore, if the strong light beam is irradiated to the record medium only during the information reading period, the repetition of reproducing information can be improved. In particular, since the phase-change recording material is melted, reliability can be remarkably improved when the strong light beam is irradiated to the record medium only during the information reading period.

Moreover, in the example shown in FIG. 1, a track shift is detected by the three-beam method; however, the present invention is not limited to the method for detecting a track shift. For example, a known method, in which one light beam is irradiated to the record medium and light reflected from or transmitted through the record medium is detected to read information and detect a track shift, can be applied to the present invention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical reproducing method using a record medium comprising a substrate having concave or convex information pits and a thermosensitive material film, formed on the substrate, which is changed from a high reflectance state to a low reflectance state when a temperature thereof exceeds a predetermined temperature T and returns to the high reflectance state when the temperature thereof decreases to the temperature T or less, wherein a light beam having a predetermined power is irradiated onto the record medium to read information recorded in the record medium, the predetermined power of the light beam being set so that a temperature of the thermosensitive material film on the pits exceeds the temperature T while the pits are irradiated with the light beam and a temperature of the thermosensitive material film on flat portions between the pits is maintained at the temperature T or less while the flat portions between the pits are irradiated with the light beam.

2. An optical reproducing method according to claim 1, wherein the thermosensitive material film is a phase-change type recording material which melts to attain the low reflectance state when the temperature thereof exceeds the temperature T and which solidifies to attain the high reflectance state when the temperature thereof decreases the temperature T or less.

3. An optical reproducing method according to claim 2, wherein the thermosensitive material film is a phase-change type recording material which melts to attain the low reflectance state when the temperature thereof exceeds the temperature T and which crystallizes to attain the high reflectance state when the temperature thereof decreases to the temperature T or less.

4. An optical reproducing method using a record medium comprising a substrate having concave or convex information pits, a thermosensitive material film, formed on the substrate, which is changed from a high reflectance state to a low reflectance state when a temperature thereof exceeds a predetermined temperature T and returns to the high reflectance state when the temperature thereof decreases to the temperature T or less, and a reflective layer formed on the thermosensitive material film, a phase difference between a light reflected from the thermosensitive material film on flat portions between the pits and a light transmitted through the thermosensitive material film on the pits and reflected from the reflective layer being larger than a phase difference between a light reflected from the thermosensitive material film on the flat portions and a light reflected from the thermosensitive material film on the pits, wherein a light beam having a predetermined power is irradiated onto the record medium to read information recorded in the record medium, the predetermined power of the light beam being set so that a temperature of the thermosensitive material film on the pits exceeds the temperature T while the pits are irradiated with the light beam and a temperature of the thermosensitive material film on the flat portions is maintained at the temperature T or less while the flat portions are irradiated with the light beam.

5. An optical record medium comprising:

a substrate having concave or convex information pits;

a thermosensitive material film, formed on the substrate, which is changed from a high reflectance state to a low reflectance state when a temperature thereof exceeds a predetermined temperature T and returns to the high reflectance state when the temperature thereof decreases to the temperature T or less; and a reflective layer formed on the thermosensitive material film, wherein a phase difference between a light reflected from the thermosensitive material film on flat portions between the pits and a light transmitted through the thermosensitive material film on the pits and reflected from the reflective layer is larger than a phase difference between a light reflected from the thermosensitive material film on the flat portions and a light reflected from the thermosensitive material film on the pits.

6. An optical recording medium according to claim 5, wherein the thermosensitive material film is a phase-change type recording material which melts to attain the low reflectance state when the temperature thereof exceeds the temperature T and which solidifies to attain the high reflectance state when the temperature thereof decreases to the temperature T or less.

7. An optical recording medium according to claim 6, wherein the thermosensitive material film is a phase-change type recording material which melts to attain the low reflectance state when the temperature thereof exceeds the temperature T and which crystallizes to attain the high reflectance state when the temperature thereof decreases to the temperature T or less.

8. An optical recording medium according to claim 5, wherein the phase difference between the light reflected from the thermosensitive material film on the flat portions and the light transmitted through the thermosensitive material film on the pits and reflected from the reflective layer is ½ of a wavelength of a light beam for reading information.

9. An optical record medium according to claim 5, wherein assuming that a refractive index of the substrate is n, a wavelength of a light beam for reading information is $\lambda$, and a depth of the pits is d, the depth d satisfies the relation $nd \leq \lambda/8$.

10. An optical record medium according to claim 5, wherein assuming that a thickness of the thermosensitive material film is $W_1$ and a depth of the pits is d, the depth d satisfies the relation $W_1 \leq d$.

11. An optical reproducing device for reading information from a record medium comprising a substrate having concave or convex information pits and a thermosensitive material film, formed on the substrate, which is changed from a high reflectance state to a low reflectance state when a temperature thereof exceeds a predetermined temperature T and returns to the high reflectance state when the temperature thereof decreases to the temperature T or less, the device comprising:

a light source for emitting a light beam for reading information;

converging means for converging the light beam emitting from the light source on the record medium;

photodetecting means for detecting light reflected from or transmitted through the record medium;

reading means for reading information recorded on the record medium on the basis of an output signal from the photodetecting means;

command signal generating means for generating a command signal starting reading of the information; and power control means for setting power of the light beam irradiated to the record medium in response to the command signal from the common signal generating means so that a temperature on the thermosensitive material film on the pits exceeds the temperature T while the pits are irradiated with the light beam and a temperature of the thermosensitive material film on flat portions between the pits is maintained at the temperature T or less while the flat portions are irradiated with the light beam.

\* \* \* \* \*

UNITED STATES PATENT AND TRADE MARK OFFICE
CERTIFICATE OF CORRECTION

PATENT NO.   : 5,610,879
DATED        : March 11, 1997
INVENTOR(S)  : Moriya et al.

It is certified that error appears in the above-identified patent and that said Letters Patent is hereby corrected as shown below:

On the cover page, item [73], after "Co." insert --,--.

On the cover page, item [56] References Cited, U.S. Patent Documents:

"5,291,470  3/1994  Yamaguchi et al." should be
--5,291,470  3/1994  Nishiuchi et al.--.

--5,297,128  3/1994  Yamaguchi et al.-- should be listed.

Signed and Sealed this

Twenty-fourth Day of February, 1998

*Attest:*

BRUCE LEHMAN

*Attesting Officer*    Commissioner of Patents and Trademarks